(12) United States Patent
Stachowiak, Jr.

(10) Patent No.: US 10,822,839 B2
(45) Date of Patent: Nov. 3, 2020

(54) RETAINED LOCK SYSTEM AND METHOD

(75) Inventor: John Edward Stachowiak, Jr., Houston, TX (US)

(73) Assignee: DeWalch Technologies, Inc., Houston, TX (US)

( * ) Notice: Subject to any disclaimer, the term of this patent is extended or adjusted under 35 U.S.C. 154(b) by 0 days.

(21) Appl. No.: 12/660,990

(22) Filed: Mar. 8, 2010

(65) Prior Publication Data

US 2011/0006552 A1 Jan. 13, 2011

Related U.S. Application Data

(63) Continuation of application No. 12/002,918, filed on Dec. 18, 2007, now abandoned, which is a continuation-in-part of application No. 11/447,530, filed on Jun. 5, 2006, now abandoned, application No. 12/660,990, filed on Mar. 8, 2010, which is a continuation-in-part of application No. PCT/US2006/021947, filed on Jun. 5, 2006.

(60) Provisional application No. 60/686,695, filed on Jun. 3, 2005.

(51) Int. Cl.
  *E05B 65/00* (2006.01)
  *F16B 2/06* (2006.01)
  *F16B 21/16* (2006.01)
  *F16L 23/04* (2006.01)
  *E05B 67/36* (2006.01)

(52) U.S. Cl.
  CPC .......... *E05B 65/0089* (2013.01); *F16B 2/06* (2013.01); *F16B 21/165* (2013.01); *F16L 23/04* (2013.01); *E05B 67/365* (2013.01); Y10T 70/5566 (2015.04); Y10T 292/205 (2015.04)

(58) Field of Classification Search
  CPC .... E05B 65/0089; E05B 67/36; E05B 67/365; F16B 2/06; F16B 21/16; F16B 21/165
  USPC .............. 70/14, 32–34, 164, 226, 233, 386; 292/256.6
  See application file for complete search history.

(56) References Cited

U.S. PATENT DOCUMENTS

| 1,843,013 | A | | 1/1932 | Buettner | |
|---|---|---|---|---|---|
| 3,867,822 | A | * | 2/1975 | Morse et al. .................... | 70/164 |
| 4,329,860 | A | * | 5/1982 | Moberg .......................... | 70/164 |
| 4,413,490 | A | * | 11/1983 | Nielsen, Jr. ..................... | 70/164 |
| 4,415,190 | A | * | 11/1983 | Finck et al. ................ | 292/256.6 |
| 4,611,478 | A | * | 9/1986 | Carlson et al. ................. | 70/164 |
| 4,828,300 | A | * | 5/1989 | Agbay ....................... | 292/256.6 |
| 5,357,835 | A | | 10/1994 | Moellering | |

(Continued)

OTHER PUBLICATIONS

ISR and Written Opinion dated May 24, 2007 for International Application No. PCT/US2006/021947 filed Jun. 5, 2006 (27 pages).

(Continued)

*Primary Examiner* — Christopher J Boswell
(74) *Attorney, Agent, or Firm* — DeWalch Technologies, Inc.

(57) ABSTRACT

An apparatus for securing first and second ends of a meter sealing ring, the meter sealing ring adapted for use in installing a meter to a watthour meter box. The apparatus comprises a lock having a head member and a shank portion comprising moveable locking members, with the shank portion being insertable through an aperture formed in the first end of the sealing ring. The apparatus further comprises at least a retaining sleeve adapted to capture the shank portion, wherein the lock is retained on the first end of the sealing ring.

20 Claims, 6 Drawing Sheets

(56) References Cited

U.S. PATENT DOCUMENTS

| | | | | |
|---|---|---|---|---|
| 5,542,722 | A * | 8/1996 | DeWalch | 292/256.6 |
| 6,032,989 | A * | 3/2000 | DeWalch et al. | 292/256.6 |
| 6,367,851 | B1 * | 4/2002 | Davis | 292/256.6 |
| 6,406,074 | B1 * | 6/2002 | Mahaney | 292/327 |
| 6,439,010 | B1 * | 8/2002 | Julicher | 70/164 |
| 6,467,751 | B1 | 10/2002 | Korpanty et al. | |
| 6,684,670 | B1 * | 2/2004 | Agbay et al. | 70/164 |
| 6,763,691 | B1 | 7/2004 | Rafferty | |

OTHER PUBLICATIONS

E-mail/Letter correspondence between Applicant and Foreign Counsel dated Mar. 21, 2013 through Mar. 22, 2013 regarding amendments and MIIP Office Action in connection with Mexican Patent Application No. MX/A/2007/015312 (5 pages).
E-mail/Letter from Foreign Counsel dated Apr. 11, 2013 regarding MIIP Notice of Allowance in connection with Mexican Patent Application No. MX/A/2007/015312 (2 pages).
International Application Serial No. PCT/US2006/021947 filed Jun. 5, 2006 (2 pages).
Non-final Rejection dated Oct. 24, 2006 in connection with related (U.S. Appl. No. 11/447,530)) (5 pages).
Applicant's Response to Non-Final Rejection with Amendment dated Apr. 24, 2007 in connection with related (U.S. Appl. No. 11/447,530)) (9 pages).
Final Rejection dated Jun. 18, 2007 in connection with related (U.S. Appl. No. 11/447,530)) (5 pages).
Applicant's Response to Final office Action with Amendment dated Dec. 18, 2007 in connection with related (U.S. Appl. No. 11/447,530)) (9 pages).
Advisory Action dated Jan. 16,2008 in connection with related (U.S. Appl. No. 11/447,530)) (13 pages).
Abandonment dated Jan. 24, 2008 in connection with related (U.S. Appl. No. 11/447,530)) in lieu of (U.S. Appl. No. 12/002,918) (2 pages).
Non-Final Rejection dated Dec. 18, 2008 in connection with related (U.S. Appl. No. 12/002,918)) (6 pages)
Applicant's Response to Non-Final Rejection dated Jun. 18, 2009 in connection with related (U.S. Appl. No. 12/002,918)) (13 pages).
Final Rejection dated Sep. 8, 2009 in connection with related (U.S. Appl. No. 12/002,918)) (5 pages).
Abandonment dated Jun. 22, 2010 in connection with related (U.S. Appl. No. 12/002,918)) in lieu of (U.S. Appl. No. 12/660,990) (3 pages).
Non-Final Rejection dated Sep. 16, 2009 in connection with related (U.S. Appl. 11/921,254)) (10 pages).
Applicant's Response to Non-Final Rejection with Amendment and Extension dated Mar. 16, 2010 in connection with related (U.S. Appl. No. 11/921,254) (17 pages).
Final Rejection dated Jun. 14, 2010 in connection with related (U.S. Appl. 11/921,254) (9 pages).
Applicant's submitted Extension of Time dated Dec. 14, 2010 in connection with related (U.S. Appl. No. 11/921,254)) (7 pages).
Abandonment dated Mar. 8, 2011 in connection with related (U.S. Appl. No. 11/921,254) in lieu of (U.S. Appl. 12/968,276) (3 pages).
Ad/Brochure/etc.—Inner-Tite Corp. Brochure—Preloaded Multi-Shot Meter Locking Ring is the ideal solution . . . (Sep. 2, 2005)(1 page).*—*(This information was in file and shows a date which is after the filing date of the above-referenced application; it is believed that this information is not prior art and no admission is being made regarding applicability, relevancy, materiality or otherwise and as per IDS Statement Submitted herewith).
Ad/Brochure/etc.—Highfield—AMLR Ring News and as noted: dated Oct. 21, 2010 (2 pages).*—*(This information was in file and shows a date which is after the filing date of the above-referenced application; it is believed that this information in not prior and no admission is being made regarding applicability, relevancy, materiality or otherwise and as per IDS Statement Submitted herewith).

Ad/Brochure/etc.—E-mail dated Mar. 14, 2011 providing information regarding Inner-Tite Corp. Brochure—Preloaded Multi-Shot Meter Locking Ring is the ideal solution . . . (Sep. 2, 2005) (2 pages).*—*(This information was in file and shows a date which is after the filed of the above-referenced application; it is believed that this information is not prior art and no admission is being made regarding applicability, relevancy, materiality or otherwise arid as per IDS Statement Submitted herewith).
Ad/Brochure/etc.—E-mail dated Mar. 24, 2011 providing information regarding Inner-Tite Corp. Ad—Multi-Shot Meter Locking Ring regarding U.S. Pat. No. 6,684,670 (2 pages).*—*(This information was in file and shows a date which is after the filed of the above-referenced application; it is believed that this information is not prior art and no admission is being made regarding applicability, relevancy, materiality or otherwise and as per IDS Statement Submitted herewith).
Ad/Brochure/etc.—Highfield—AMLR Ring and as noted (1 page).*—*(This information was in file and shows a date which is after the filed of the above-referenced application; it is believed that this information is not prior art and no admission is being made regarding applicability, relevancy, materiality or otherwise and as per IDS Statement Submitted herewith).
Non-Final Rejection dated Mar. 5, 2012 in connection with related U.S. Appl. No. 12/968,276 (9 pages).
Applicant's Response to Non-Final Rejection dated Sep. 5, 2012 in connection with related U.S. Appl. No. 12/968,276 (21 pages).
Final Rejection dated Nov. 13, 2012 in connection with related U.S. Appl. No. 12/968,276 (10 pages).
Applicants Response to Final Rejection with RCE dated Apr. 15, 2013 in connection with related U.S. Appl. No. 12/968,276 (26 pages).
Non-Final Rejection dated Jun. 7, 2013 in connection with related U.S. Appl. No. 12/968,276 (11 pages).
Applicant's Response to Non-Final Rejection with Amendment dated Dec. 5, 2013 in connection with related U.S. Appl. No. 12/968,276 (24 pages).
Final Rejection dated Feb. 10, 2014 in connection with related U.S. Appl, No. 12/968,276 (12 pages).
Applicant's Response to Final Rejection with RCE dated Aug. 9, 2014 in connection with related U.S. Appl. No. 12/968,276 (17 pages).
Non-Final Rejection dated Dec. 24, 2014 in connection with related U.S. Appl. No. 12/968,276 (11 pages).
Applicant's Response to Non-Final Rejection with Amendment dated Jun. 24, 2015 in connection with related U.S. Appl. No. 12/968,276 (18 pages).
Final Rejection dated Sep. 1, 2015 in connection with related U.S. Appl. No. 12/968,276 (11 pages).
Applicant's Response to Final Rejection with RCE and Amendment dated Mar. 1, 2016 in connection with related U.S. Appl. No. 12/968,276 (22 pages).
Non-Final Rejection dated Aug. 5, 2016 in connection with related U.S. Appl. No. 12/968,276 (12 pages).
Applicant's Response to Non-Final Rejection with Notice of Appeal and IDS dated Feb. 6, 2017 in connection with related U.S. Appl. No. 12/968,276 (18 pages).
Applicants Summary of Interview with Examiner dated Jul. 3, 2017 in connection with related U.S. Appl. No. 12/968,276 (4 pages).
Applicant's Response to Non-Final Rejection with Rce and Amendment dated Jul. 6, 2017 in connection with related U.S. Appl. No. 12/968,276 (22 pages).
Response to Advisory Action with RCE dated Aug. 7, 2017 in connection with related U.S. Appl. No. 12/968,276 (43 pages).
Non-final Rejection dated Feb. 2, 2018 in connection with related U.S. Appl. No. 12/968,276 (27 pages).
Applicant's Response to Non-Final Rejection dated Aug. 2, 2018 in connection with related U.S. Appl. No. 12/968,276 (23 pages).
Final Rejection dated Oct. 26, 2018 in connection with related U.S. Appl. No. 12/968,276 (7 pages).
Applicant's Response to Final with RCE dated Apr. 26, 2019 in connection with related U.S. Appl. No, 12/968,276 (19 pages).

(56) References Cited

OTHER PUBLICATIONS

IDS dated Apr. 26, 2019 in connection with related U.S. Appl. No. 12/968,276 (659 pages).

* cited by examiner

RETAINED LOCK SYSTEM AND METHOD

CROSS-REFERENCE TO RELATED APPLICATIONS

This application is a continuation of application Ser. No. 12/002,918, filed Dec. 18, 2007, which is a continuation-in-part of application Ser. No. 11/447,530, filed Jun. 5, 2006, which claims the benefit of U.S. Provisional Patent Application No. 60/686,695, filed Jun. 3, 2005. This application also is a continuation-in-part of International Application No. PCT/US2006/021947, filed Jun. 5, 2006. This application also is a continuation-in-part of the application Ser. No. 11/921,254; filed on Nov. 29, 2007 which is a national stage of International Application No. PCT/US2006/021947, filed Jun. 5, 2006.

The instant application claims priority to each of the above-referenced applications. All written material, figures, content and other disclosure in each of the above-referenced applications to the fullest extent permitted are hereby incorporated by reference.

BACKGROUND OF THE INVENTION

The present invention relates generally to a lock with a retaining structure, and more specifically, it relates to apparatus, systems and methods for securing at least one structure at least one structure or a portion of a utility service enclosure such as, for example, a watthour meter sealing ring to prevent the separation of two opposing members of the watthour meter sealing ring or, for example, a plurality of structures used with a utility service enclosure, or for example, a watthour meter socket ring to prevent the separation of two opposing members of the watthour meter socket box ring, or used to seal, for example, a trucking, shipping, an airline or other transportation or security container.

In the electric utility industry, for example, a locking apparatus or seal is useful to secure access panels of enclosures containing electrical or metering equipment. Such a locking apparatus or seal also ideally includes tamper-evident features to indicate unwanted tampering with the seal or attempts to access a secured electrical meter box or the like.

Electrical service providers generally deliver electricity to their customers via power lines buried underground or distributed along poles or towers overhead. The provider's power lines are usually distributed from a power generation station to numerous sets of customer lines, so that customers can then use the power to satisfy their various electrical needs. To measure delivered power so that customers can be billed in proportion to their usage, service providers typically terminate their power lines at a customer's home or business facility through a metered socket box, various designs for which are well known.

A meter box is generally used by electric utility companies, however the invention herein may be used with other utility service enclosures in the gas, water, cable, TV utility industries or in other industries as well.

An example of one previously known meter box consists of two sets of electrical posts, with a provider's transmission lines being connected to one set of posts, and the customer's service lines to the other set. In order to measure the amount of electricity a customer uses, the meter box is configured to accept a watt-hour meter or another electricity usage measurement device, which, when plugged into the socket box, permits transmission of electricity from the provider to the customer and allows the amount of transmitted electricity to be accurately measured, so that the provider can charge the customer for power usage at an appropriate rate.

Various designs and uses for watthour meters are also well known, and all such designs and uses are incorporated by reference into the teachings of the present invention. The present invention is also applicable in situations where the customer's service lines are routed from the meter box to a breaker box so that electricity can be distributed to multiple service locations using additional sets of electrical lines or wires.

Presently, there are various types of meter socket boxes, each distinguished by the manner in which the meter is secured in place once it has been plugged into an electrical socket disposed in the meter box. For example, a ringed-type meter box fitted with a flanged front cover is known, within which a watthour meter is disposed so that a head portion of the meter passes out through a flanged opening in the front cover. In this configuration, the meter is generally held in place using an annular, lockable sealing ring. A plunger type lock is typically used that is adapted to hold the ends of the sealing ring together. However, the lock is typically separate from the sealing ring before installation. This type of lock also has to be in the "unlocked" position prior to installation; this results in operator inconvenience due to the need for having to handle multiple components simultaneously. When the sealing ring is removed from the meter box, the lock will separate from the apertures or confines of the sealing ring, thus forcing the ring installer to once again handle multiple components simultaneously when the sealing ring is to be reinstalled on a meter box. Moreover, sometimes a key is required to reengage the lock.

In an attempt to overcome some of these shortcomings, there are various locks that can be installed on ring-type meter socket boxes. Some of these locks can be locked without the use of a key or describe other locking features. Several examples of patents which disclose attempts to solve some of the above problems are set forth as follows.

U.S. Pat. No. 6,684,670 to Agbay et al., entitled "Lock assembly with self retained barrel lock," is directed to a security device which comprises a first component having a through first passageway surrounded by an internal first recess, and a second component having a second passageway surrounded by an internal second recess. The first and second components are configured for assembly in a mating relationship with the first and second passageways in communication with each other and in coaxial alignment. A lock has a barrel containing a spring and plunger and carrying radially shiftable locking elements, with the plunger being normally biased by the spring in one direction urging the locking elements into expanded positions protruding radially from the barrel. The barrel is insertable into and releasably retained in an unlocked position in the first passageway with the locking elements expanded radially outwardly into the first recess, and is shiftable by a forwardly applied axial force into a locked position in the second passageway with the locking elements expanded into the second recess. The first recess has a forward surface configured to coact with the locking elements in response to the forwardly applied force to exert a reactionary force urging the locking elements radially inwardly and urging the plunger in the opposite direction to accommodate retraction of the locking elements from the first recess. This reference is incorporated by reference herein.

U.S. Pat. No. 6,574,999 to Chen, entitled "Padlock with a U-shaped lock casing," sets forth a padlock which includes a U-shaped lock casing having intercommunicated core receiving space and latch recess, aligned first and second shackle insert holes, and a slide channel communicating the second shackle insert hole with the latch recess. A lock core unit is received in the core receiving space, and includes a latch member extending into the latch recess and rotatable inside the latch recess between locking and unlocking positions. The latch member has an end face formed with a pin hole eccentric to an axis of the lock core unit. A shackle bar extends into the first and second shackle insert holes. A catch member is disposed slidably in the latch recess, and is formed with a pin extending rotatably into the pin hole in the latch member for engaging the latch member. This reference is incorporated by reference herein.

U.S. Pat. No. 6,467,751 to Korpanty et al., entitled "Inflation valve," is directed to an inflation valve which has a valve housing having an inner wall, a cylindrical inner chamber terminating in a gas outlet, and a gas inlet bore providing fluid communication between the inner chamber and a pressurized gas source. A piston enclosed in the inner chamber has at one end a head directed toward the gas outlet and at the opposite end a valve actuator connector. The piston further has a gas inlet seal, positioned between the head and the actuator connector, that releasably seals the gas inlet bore from the inner chamber when the piston is in a normal, non-actuated position. A valve actuator connected to the actuator connector operates to pull the piston, thereby moving the gas inlet seal away from the gas inlet bore and putting the inner chamber in fluid communication with the gas inlet bore and pressurized gas source. A regulating spring contacting the piston close to the actuator connector is compressible by the force of pressure exerted by gas contained within the inner chamber and the gas inlet bore and operates to position the piston to control or regulate the outlet pressure. This reference is incorporated by reference herein.

There remains a need for a retained lock apparatus, system, and method for securing at least one structure or a plurality of structures, to secure a utility service enclosure, such as for example, a meter sealing ring having, for example, ends adapted to mount a lock and a receiving member. There is a need for an apparatus having a retaining sleeve that prevents removal of the lock from the sealing ring after the lock has been disengaged from the lock receiving member or housing. There is a further need for a sleeve adapted to enable the lock to remain in a "preloaded" state until the meter sealing ring is to be installed onto the meter box and the lock is to be engaged into the lock receiving housing.

Those of skill in the art will appreciate the example embodiments of the present invention which addresses the above needs and other significant needs the solution to which are discussed hereinafter.

SUMMARY OF THE INVENTION

An object of the present invention is to retain a lock to a portion of a watthour meter sealing ring.

Another object of the present invention is to retain a lock to a watthour meter sealing ring after the sealing ring has been disengaged from the watthour meter and meter box base, while also allowing the lock to be engaged into a lock receiving member of the sealing ring without the use of a key.

Another object of the present invention is to provide a lock assembly that can be easily installed onto a watthour meter sealing ring Another object of the present invention is to provide a retaining sleeve that can be installed onto an assembled lock.

Another object of the present invention is to provide a meter sealing ring assembly or combination that can be installed and locked onto a watthour meter box without the need for special tools or keys.

Another object of the present invention is to provide a meter sealing ring assembly that when unlocked, will allow a lock to be easily positioned for relocking at a later time without the use of a key.

Another object of the present invention is to provide a retaining sleeve that will retain locking members (which may be cylindrical and/or moveable) of a lock.

Another object of the present invention is to provide a retaining sleeve that will slide on a lock shaft, allowing locking members (which may be spherical and/or moveable), to expand in a radial direction.

These and other objects, features, and advantages will become apparent from the drawings, the descriptions given herein, and the appended claims. However, it will be understood that the above-listed objectives and/or advantages are intended only as an aid in quickly understanding aspects of the invention, are not intended to limit the invention in any way, and therefore do not form a comprehensive or restrictive list of objectives, and/or features, and/or advantages. Accordingly, certain example embodiments provide a locking apparatus for securing at least one structure or a portion of utility service enclosure such as, for example, a watthour meter socket ring to prevent the separation of two opposing members of the watthour meter socket box ring, so as to address the needs as described above.

The general purpose of embodiments of the invention, which will be described subsequently in greater detail, is to secure at least one structure or a plurality of structures, to lock a utility service enclosure, such as for example, a meter sealing ring having ends adapted to mount a lock and a receiving member, and to retain a lock to a portion of a watthour meter sealing ring.

One example embodiment the invention generally includes at least a lock and a retaining sleeve. The retaining sleeve generally includes at least an aperture, a radial groove, a captive shoulder, and a retaining flange. The lock generally includes at least a head member, a shaft member, multiple spherical (in one example embodiment) locking members, and a cylindrical groove disposed on shaft member. The lock shaft member is adapted to pass through a portion of the sealing ring and receive (permanently, in one example embodiment) the retaining sleeve, thus captivating (or for example, slidably capturing) the lock onto the sealing ring. The captive shoulder disposed on the retaining sleeve is adapted to loosely engage onto the space defined by the cylindrical groove disposed on the shaft member, allowing the retaining sleeve to limitably slide in opposing axial positions. In one example embodiment, the retaining sleeve is preferably adapted to restrict a portion of the lock to facilitate securing the lock portion to the receiving member without the use of a key. For example, in a "preloaded" position, the retaining sleeve is located to the front of the lock shaft (furthest from the lock head), captivating and preventing the spherical locking members from extending radially into the "locked" position. When the tip of the lock shaft is inserted and pressed into the lock receiving member, the retaining sleeve slides toward the rear of the lock shaft (closest to the lock head) and away from the spherical locking members, allowing them to enter into and radially expand into the lock receiving member; this is the "locked" position. When the lock is unlocked and pulled away from the lock receiving member, the retaining sleeve is forced back to the "preloaded" position, retaining the spherical locking members once again.

Another example embodiment of the present invention includes at least a locking apparatus for securing at least one structure.

Another example embodiment provides an apparatus for securing or connecting and disconnecting a plurality of structures, each of the plurality of structures defining an aperture therein, the apparatus including at least a lock insertable into at least one of each of the apertures of the plurality of structures and a receiving member which may be releaseably or permanently retained to at least one of the plurality of structures, wherein the lock comprises a shaft member, a locking structure, and a head member; and a receiving member adapted to secure or retain at least a part of the shaft member, the plurality of structures being connected between the head member and the receiving member, wherein the head member has a structural configuration adapted to receive a key for unlocking the lock, and wherein the lock is adapted to be retained to at least one of the plurality of structures.

Another example embodiment of a system is provided for securing or connecting and disconnecting a plurality of structures, each of the plurality of structures defining an aperture therein, the system including at least means for inserting a lock into at least one of each of the apertures of the plurality of structures and a receiving member which may have means for releaseably or permanently retaining the receiving member to at least one of the plurality of structures, wherein the lock comprises a shaft member, a means for locking, and a head member; and a means for receiving the lock, the means for receiving being adapted to secure or retain at least a part of the shaft member, the plurality of structures being connected between the head member and the receiving member, wherein the head member has means for receiving a key for unlocking the lock, and wherein the lock has means for retaining the lock to at least one of the plurality of structures.

In another example embodiment of the system the plurality of structures comprises first and second ends of a ring adapted to attach a meter to a meter box structure, each of the first and second ends of the ring defining an aperture therein.

An example embodiment of a method provides for securing first and second ends of a meter sealing ring, the meter sealing ring adapted for use in installing a meter to a watthour meter box, the method including at least: mounting a lock to the first end of the sealing ring, the lock having a shank portion and a head member; and retaining the lock with a retaining sleeve, wherein the lock is retained on the first end of the sealing ring.

An example embodiment of a system provides for securing first and second ends of a meter sealing ring, the meter sealing ring adapted for use in installing a meter to a watthour meter box, the system including at least: means for mounting a lock to the first end of the sealing ring, the lock having a shank portion and a head member; and means for retaining the lock with a retaining sleeve, wherein the lock is retained on the first end of the sealing ring.

An example embodiment of an apparatus provides for securing first and second ends of a meter sealing ring, the meter sealing ring adapted for use in installing a meter to a watthour meter box, the apparatus comprising: a lock having a head member and a shank portion comprising moveable locking members, the shank portion being insertable through an aperture formed in the first end of the sealing ring; and a retaining sleeve adapted to capture the shank portion, wherein the lock is retained on the first end of the sealing ring.

An example embodiment of a method provides for securing first and second ends of a meter sealing ring, the meter sealing ring adapted for use in installing a meter to a watthour meter box, the method comprising: mounting a lock to the first end of the sealing ring, the lock having a shank portion and a head member; retaining the lock with a retaining sleeve, wherein the lock is retained on the first end of the sealing ring; and securing the lock portion to a receiving member with the first and second ends held between the receiving member and head member.

An example embodiment of the method further comprises the step of slidably capturing a part of the lock portion within the retaining sleeve, wherein the lock portion is selectively guidable when securing the lock portion to the receiving member in a locked position.

An example embodiment of the method further comprises the step of preloading a part of the lock portion within the retaining sleeve to facilitate securing the lock portion to the receiving member without the use of a key.

An example embodiment of the method further comprises the step of releaseably securing the lock portion to the receiving member.

In another example embodiment of the method the lock portion may be removed from the receiving member in an unlocked position, and wherein the lock portion remains retained by the retaining sleeve.

An example embodiment of the method further comprises the step of releaseably retaining the lock portion to the retaining member wherein the lock portion may be completely withdrawn from the aperture of the sealing ring An example embodiment of the method further comprises further comprising the step of interengaging the lock, first and second ring ends, retaining sleeve, and receiving member as a combination, wherein at least a portion of the combination is separable but still interengaged in the combination.

An example embodiment of the system provides for securing first and second ends of a meter sealing ring, the meter sealing ring adapted for use in installing a meter to a watthour meter box, the system comprising: means for mounting a lock to the first end of the sealing ring, the lock having a lock portion and a head member; means for retaining the lock portion with a retaining sleeve, wherein the lock is retained on the first end of the sealing ring. Another embodiment may include means for securing the lock portion to a receiving member with the first and second ends held between the receiving member and head member.

An example embodiment of the system further comprises means for slidably capturing a part of the lock portion within the retaining sleeve, wherein the lock portion is selectively guidable when securing the lock portion to the receiving member in a locked position.

An example embodiment of the system further comprises means for preloading a part of the lock portion within the retaining sleeve to facilitate securing the lock portion to the receiving member without the use of a key.

An example embodiment of the system further comprises means for releaseably securing the lock portion to the receiving member.

In another example embodiment of the system the lock portion may be removed from the receiving member in an unlocked position, and wherein the lock portion remains retained by the retaining sleeve.

An example embodiment of the system further comprises means for releaseably retaining the lock portion to the retaining member wherein the lock portion may be completely withdrawn from the aperture of the sealing ring.

An example embodiment of the system further comprises means for interengaging the lock, first and second ring ends, retaining sleeve, and receiving member as a combination, wherein at least a portion of the combination is separable but still interengaged in the combination.

An example embodiment of an apparatus provides for securing first and second ends of a meter sealing ring, the meter sealing ring adapted for use in installing a meter to a watthour meter box, the apparatus comprising: a lock having a head member and a shank portion comprising moveable locking members, the shank portion being insertable through an aperture formed in the first end of the sealing ring; a retaining sleeve adapted to capture the shank portion, wherein the lock is retained on the first end of the sealing ring; and a receiving member adapted to secure the moveable locking members of the shank portion with the first and second ends of the ring held between the receiving member and head member.

The content and disclosure of each of the following applications/publications to the extent permitted are specifically hereby incorporated by reference: application Ser. No. 12/002,918, filed Dec. 18, 2007; U.S. Provisional Patent Application No. 60/686,695, filed Jun. 3, 2005; application Ser. No. 11/447,530, filed Jun. 5, 2006; International Application No. PCT/US2006/021947, filed Jun. 5, 2006; application Ser. No. 11/921,254; filed on Nov. 29, 2007 which is a national stage of International Application No. PCT/US2006/021947, filed Jun. 5, 2006.

There has thus been outlined, rather broadly, features of example embodiments of the invention in order that the detailed description thereof may be better understood, and in order that the present contribution to the art may be better appreciated. There are additional features of example embodiments of invention that will be described hereinafter.

In this respect, before explaining at least one example embodiment of the invention in detail, it is to be understood that the example embodiments are not limited in its application to the details of construction and to the arrangements of the components set forth in the following description or illustrated in the drawings. Various example embodiments are capable of other further embodiments and of being practiced and carried out in various ways. Also, it is to be understood that the phraseology and terminology employed herein are for the purpose of the description and should not be regarded as limiting.

To the accomplishment of the above and related objects, example embodiments of the invention may be embodied in the form illustrated in the accompanying drawings, attention being called to the fact, however, that the drawings are illustrative only, and that changes may be made in the specific construction illustrated.

BRIEF DESCRIPTION OF THE DRAWINGS

Various other objects, features and attendant advantages of the embodiments of the invention will become fully appreciated as the same becomes better understood when considered in conjunction with the accompanying drawings, and wherein.

While various example embodiments of the invention will be described herein, it will be understood that it is not intended to limit the invention to those embodiments. On the contrary, it is intended to cover all alternatives, modifications, and equivalents included within the spirit of the invention.

DETAILED DESCRIPTION OF THE INVENTION

Turning now descriptively to the drawings, in which similar reference characters denote similar elements throughout the several views, the attached figures illustrate an apparatus for securing a plurality of structures or a portion of a utility service enclosure. For example, in one embodiment, the apparatus is used for securing a watthour meter socket ring so as to prevent the separation of two opposing members of the watthour meter socket box ring. The apparatus may be used for creating a tamper-evident seal by securably connecting a plurality of structures. The apparatus may also be used as a locking assembly with at least one structure as will hereinafter be explained in further detail.

Figure 1:
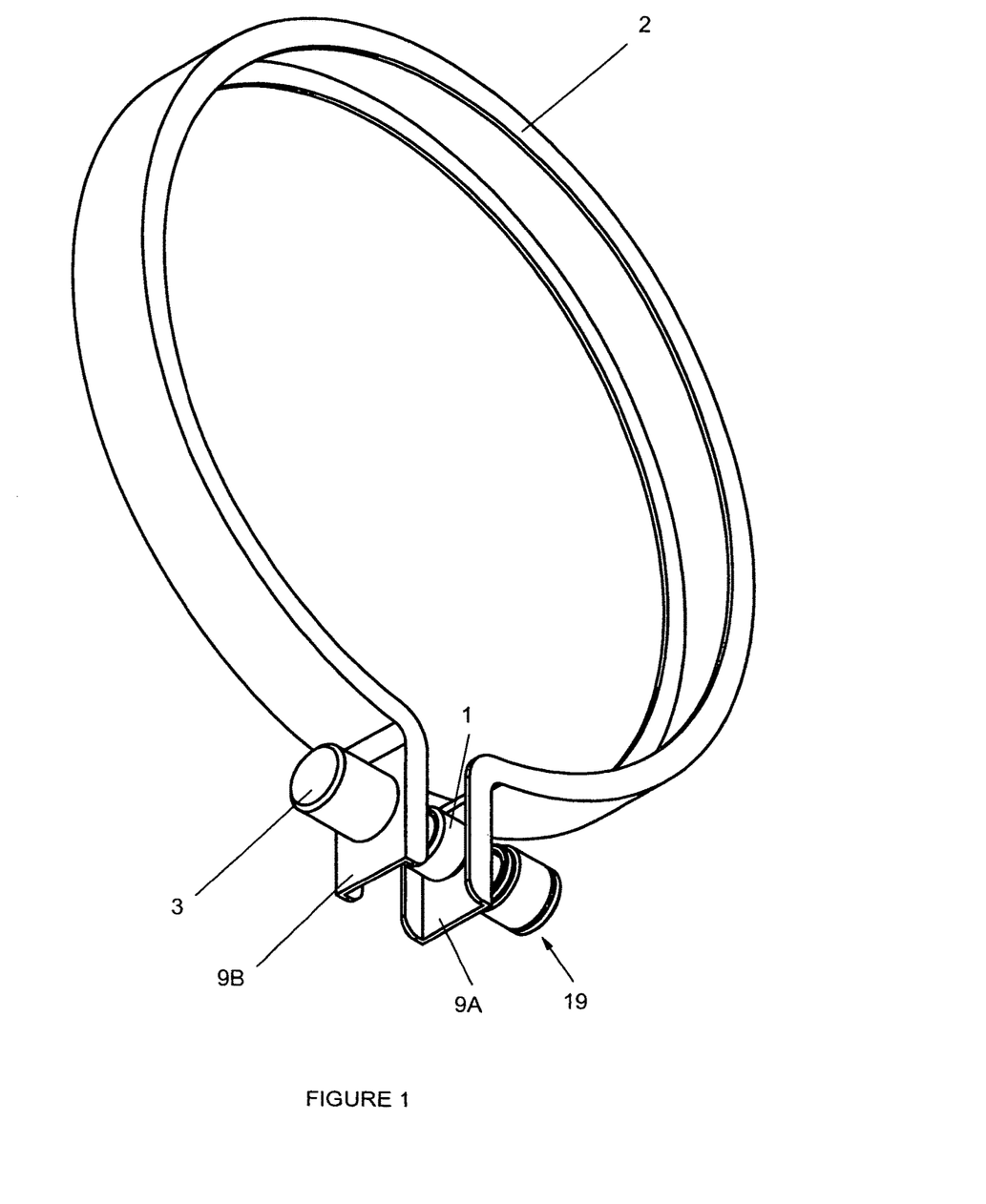
FIG. 1 is a perspective view of the present invention of the lock and retaining sleeve installed with a watthour meter sealing ring in accord with one possible embodiment of the present invention.

Referring now to FIG. 1, there is shown a securing sealing ring 2 for a ringed-type meter box (not shown). In order to hold a meter (not shown) in place and prevent its removal from the meter box, both the meter and meter base incorporate a corresponding set of flanges (not shown) that are retained together with an annular, lockable sealing ring 2. The lockable sealing ring 2 is designed to encase and captivate the corresponding flanges of the meter and base when the ends 9A, 9B of the sealing ring 2 are held or connected together. There are different types of lock devices for holding or connecting the ends 9A, 9B together. A plunger type lock is typically used that is adapted to hold the ends of the sealing ring together.

Figure 2:
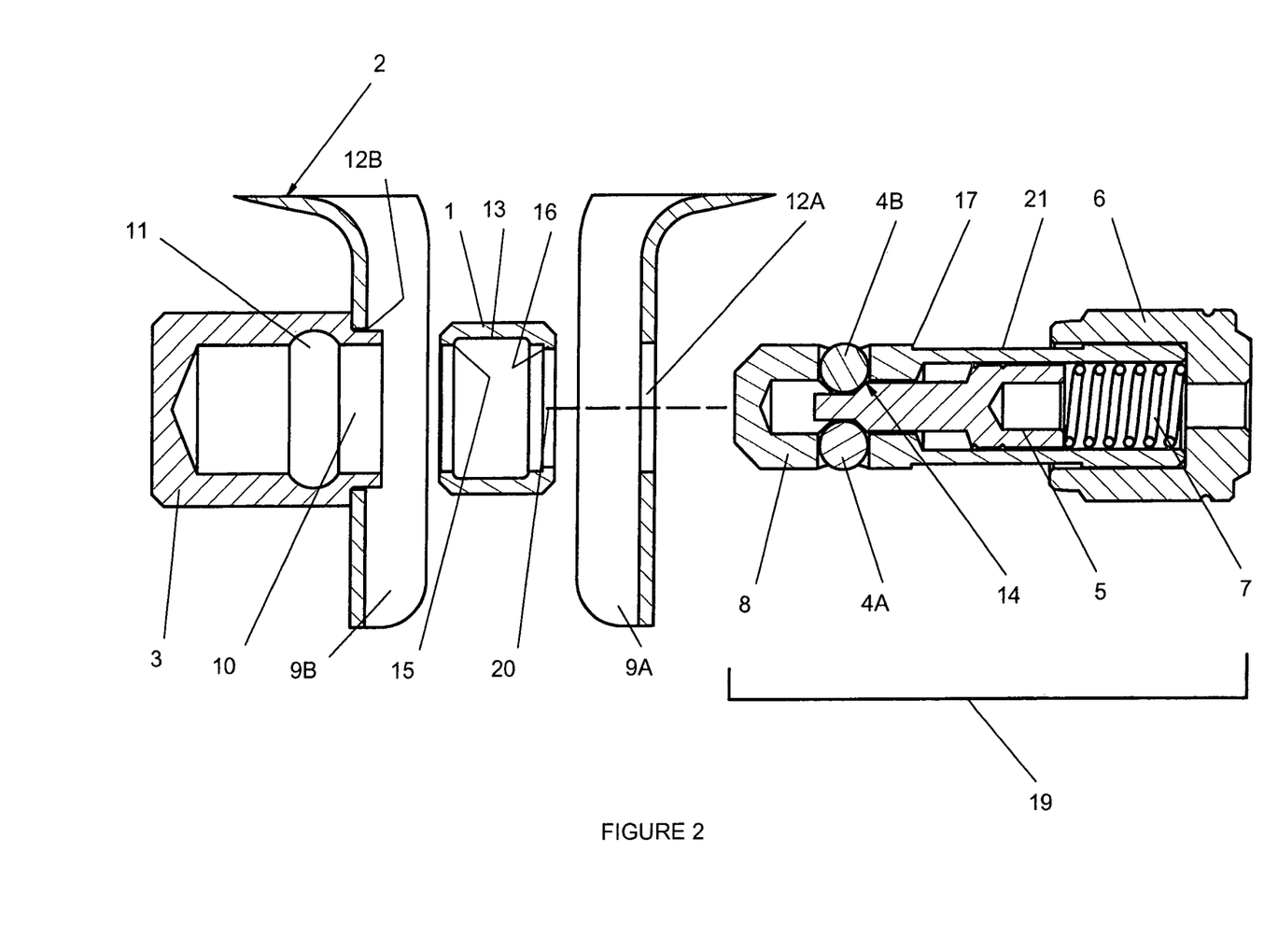
FIG. 2 is a side-section view of the present invention of a watthour meter sealing ring and the lock and retaining sleeve in the uninstalled position in accord with one possible embodiment of the present invention.

Now referring to FIGS. 1-2, there is shown one example embodiment for securing a plurality of structures with each of the plurality of structures defining an aperture therein. FIG. 2 shows a plurality of structures 9A, 9B having apertures 12A, 12B which may be any of a variety of structures. In one example embodiment, the plurality of structures comprise first and second ends 9A, 9B of a ring 2, which may be connected or disconnected, the ring being adapted to mount a meter to a meter box structure (not shown). Each of the first and second ends 9A, 9B of the ring 2 defines apertures 12A, 12B therein respectively. As shown in the embodiment of FIG. 2, a lock 19 and a retaining sleeve 1 is adapted to be installed onto a watthour meter box sealing ring 2. FIG. 2 shows the lock 19 prior to the lock being retained by retaining sleeve 1.

Figure 3:
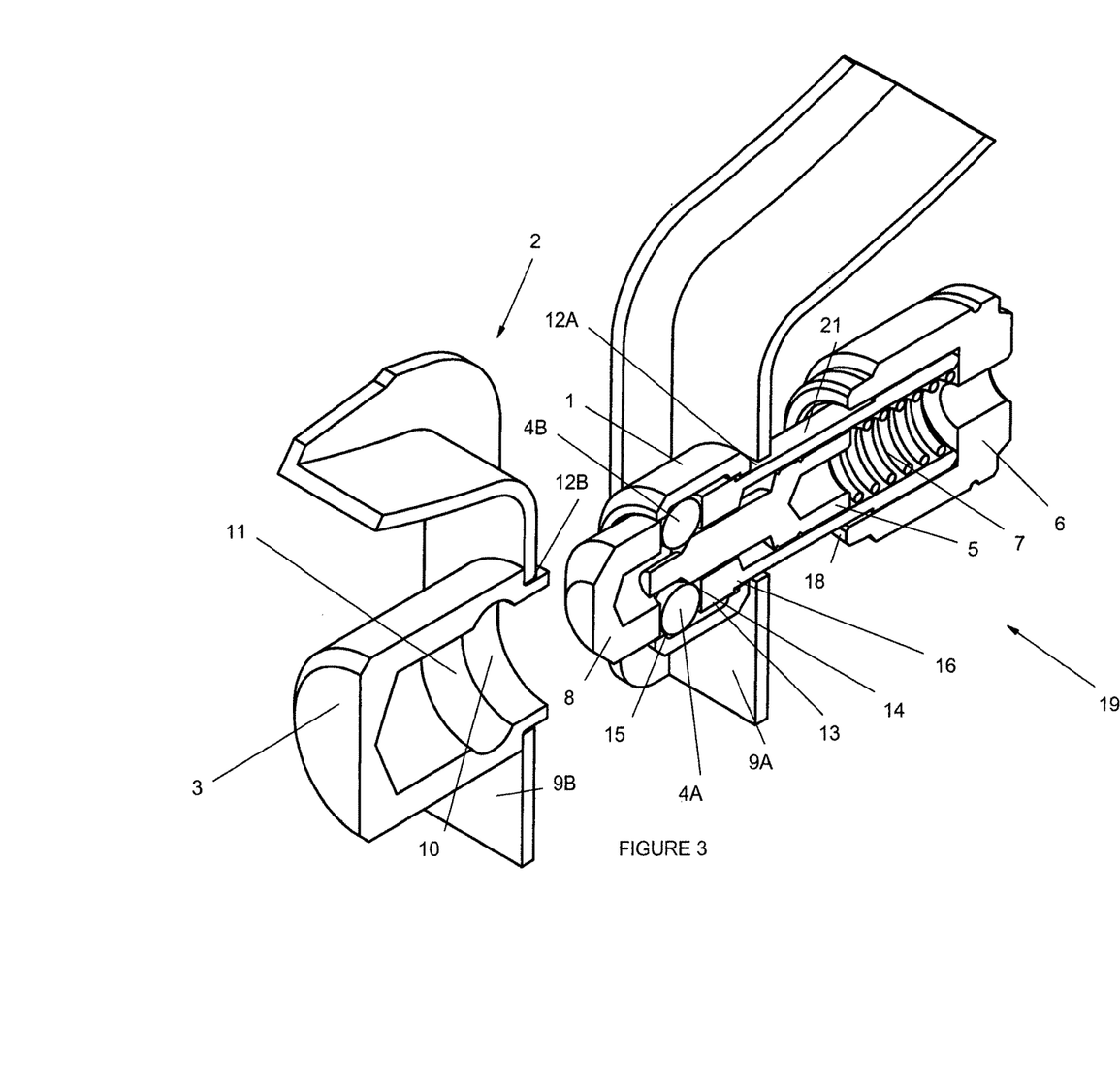
FIG. 3 is a perspective section view of the present invention of the lock and retaining sleeve, in the "preloaded" position, installed into a watthour meter sealing ring, in accord with one possible embodiment of the present invention.
Figure 4:
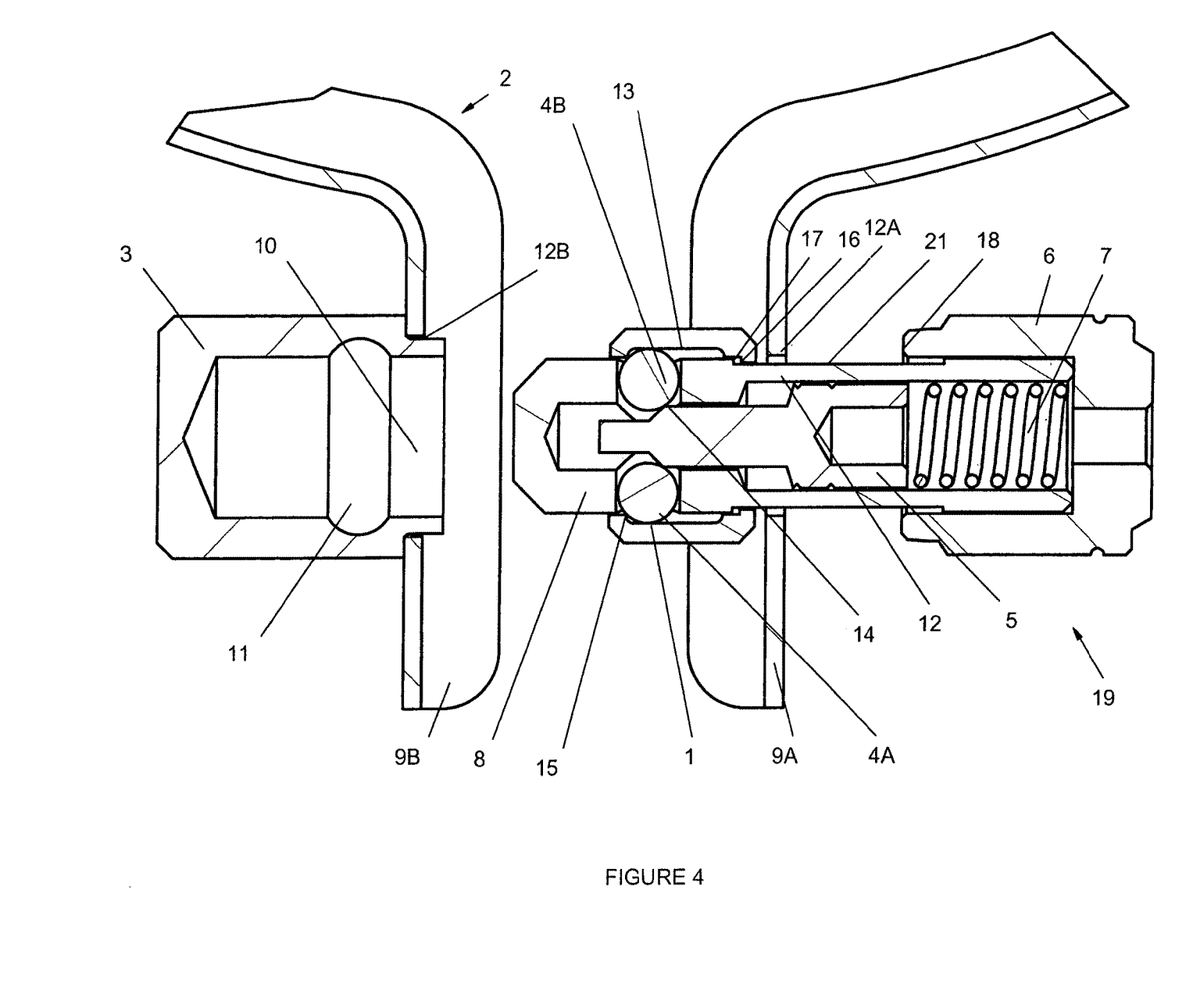
FIG. 4 is a side-section view of the lock and retaining sleeve, in the "preloaded" position, installed into a watthour meter sealing ring.

Referring now to FIGS. 1-3, there is shown one example embodiment for securing first and second ends 9A, 9B of a meter sealing ring 2, the meter sealing ring adapted for use in installing a meter to a watthour meter box. As shown in the embodiment of FIG. 3, the lock 19 has a head member 6 and a shank portion 8, which in one example embodiment is a shaft member. The lock 19 further comprises at least one and preferably two moveable locking members 4A, 4B (but may include a plurality of lock members having various other suitable configurations adapted for locking engagement). The shaft member 8 is insertable through an aperture 12A formed in the first end 9A of the sealing ring 2. In this way, the lock 19 may be viewed as being mounted to the first end of the sealing ring.

A retaining sleeve 1 is adapted to capture the shank portion or, for example, shaft member 8 wherein the lock 19 is retained on the first end 9A of the sealing ring 2. In an example embodiment, the shank portion may be viewed as being between the first and second ends 9A, 9B of the sealing ring 2.

A receiving member 3 in alternate example embodiment is adapted to secure the moveable locking members 4A, 4B of the shank portion or shaft member 8 with the first and second ends 9A, 9B of the ring 2 held between the receiving member and head member 6.

In one example embodiment, the shank portion comprises a shaft member 8 with an outer surface defining a cylindrical groove 21. The retaining sleeve preferably has an axial bore adapted to receive at least a portion of the shaft member 8 with the retaining sleeve adapted in surrounding relation with at least a portion of a cylindrical groove 21 so as to slidably capture the shaft member 8. However, it will be appreciated that the groove may only extend around a portion of the shaft or be configured like a slot or have another configuration suitable for slidable engagement and capture by the retaining sleeve 1.

As shown in the embodiment of FIG. 3 the lock 19 generally collectively comprises the head member 6, the shaft member 8, preferably multiple moveable locking members 4 ideally having a spherical configuration (or cylindrical or other configuration), the cylindrical groove 21 disposed on the shaft member 8, and a biasing structure. The biasing structure is preferably a plunger 5 and a spring 7.

In the example embodiment of FIG. 3, the retaining sleeve 1 is generally comprised of an aperture 20, a radial groove 13, a captive shoulder 4, and a retaining flange 16.

When the plunger 5 is retracted toward the head 6, as shown in FIG. 2, the spherical locking members 4 are allowed to retract radially inward, allowing the lock shaft to pass through a circular opening that is slightly larger than the lock shaft 8 diameter; this is the "unlocked position".

When in the "unlocked" position, the lock shaft 8, is adapted to pass through an aperture 12 disposed on a sealing ring member 9 and forcibly receive retaining sleeve 1. As the retaining sleeve 1 is engaged closer to the head member 6, the retaining flange 16 will collapse into the space defined by the cylindrical groove 21 disposed on the lock shaft member 8. This allows the retaining sleeve 1 to freely slide in opposing limiting axial positions, and consequently, captivating the sealing ring member 9 between the lock head 6 and the retaining sleeve 1.

Figure 5:
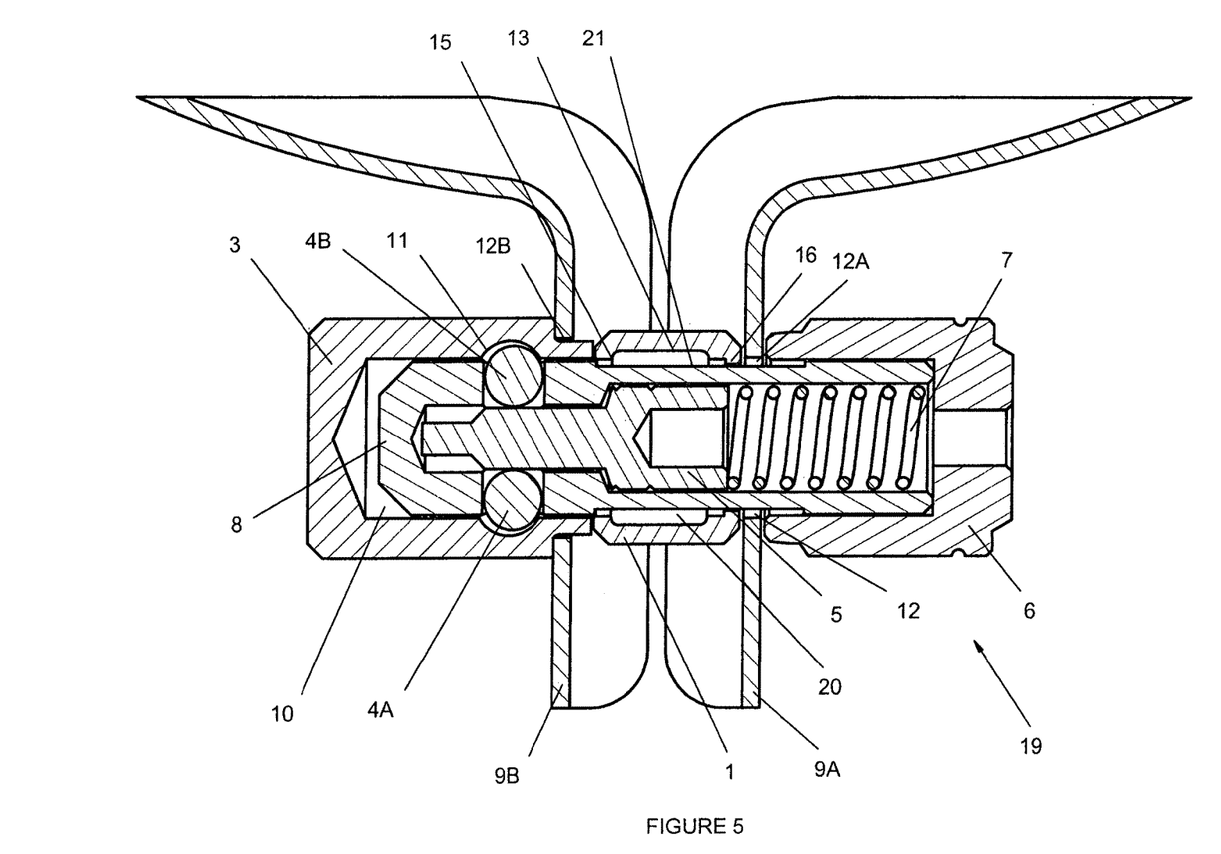
FIG. 5 is a side-section view of the lock and retaining sleeve, in the "locked" position, installed into a watthour meter sealing ring.

When the plunger 5 is released, shown in FIG. 5, the spring 7, which is captivated between the head 6 and the plunger 5, forces the plunger 5 toward the spherical locking members 4. This causes an edge 14 of the plunger 5 to force the spherical locking members 4 radially outward until the larger diameter of the plunger 5 can pass through the locking members 4; this is the "locked" position.

As the retaining sleeve 1 is moved toward the front of the lock shaft 8 (furthest from the lock head 6), the groove wall 17 disposed on the lock shaft 8 interferes with the retaining flange 16, preventing the retaining sleeve 1 from separating from the lock shaft 8. When the retaining sleeve 1 is in this position and the plunger 5 is released, the radial groove 13 captivates the locking members 4 and will not allow the plunger 5 to pass though them and into the "locked" position. This ensures that a constant force is applied to the wall of the radial groove 13 of the retaining member 1.

When the tip of the lock shaft 8 is inserted into the aperture 10 of the lock receiving member 3, the retaining sleeve 1 bears against the entry perimeter of receiving member 3 until the applied force exceeds the resistive force created by the interference between the spherical locking members 4 and the captive shoulder 15, allowing the retaining sleeve 1 to slide toward the rear of the lock shaft 8 (closest to the lock head) and away from the spherical locking members 4. This allows the lock shaft 8 to fully enter the lock receiving member 3 until the spherical locking members 4 can expand into the radial groove 11 ("locked" position). When the lock 19 is unlocked and pulled away from the lock receiving member 3, the retaining sleeve 1 is forced back to the "preloaded" position, retaining the spherical locking members 4 once again.

In another example embodiment, the retaining sleeve may also serve as a spacer-like member between a plurality structures, with the retaining sleeve being dimensioned as required to set apart the structures as desired. It may also be made of an insulating material and used as a retaining member and/or insulating member as well as a spacer.

Figure 6:
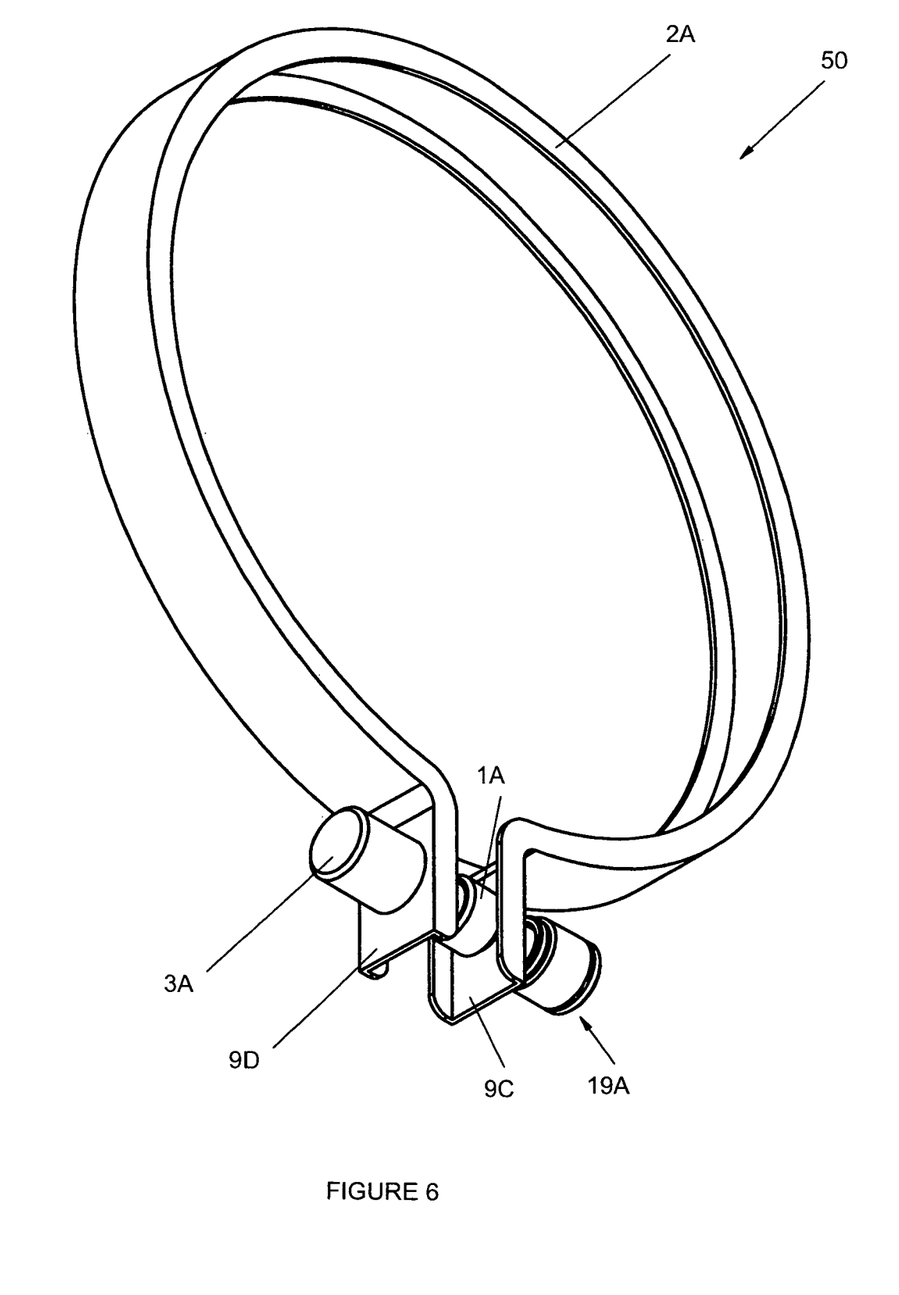
FIG. 6 is a perspective view of the present invention of a combination of the lock and retaining sleeve, receiving member, and first and second ring ends in accord with one possible embodiment of the present invention.

Another example embodiment of FIG. 6 comprises a combination 50 of the lock 19, first and second ring ends 9A, 9B, retaining sleeve 1, and receiving member 3 being cooperatively interengaged. With this configuration, at least a portion (such as the lock and housing or housing and second end of the ring or of the combination is separable, but still interengaged in the combination 50.

Various other example embodiments provide an apparatus that may be adapted for use on a utility service enclosure. Such a utility service enclosure is used not only in the electric utility industry (e.g., a meter box) but also in the gas, water, cable, TV utility industries or in other utility industries.

In another embodiment an apparatus is provided for creating a seal. A locking pin having a selected configuration is adapted to unite a plurality of structures. One example of such structures would be the ends of meter ring having apertures. However, the locking pin could also be configured to be used to unite a plurality of plates having apertures, engageable protrusions, or other engageable structural configurations such that the plates could be united with a locking pin of various configurations. A lock housing is adapted to retain at least a part of the locking pin such that the plurality of structures would be securable between a portion of the locking pin and at least a portion of the lock housing.

Various other example embodiments provide an apparatus or tamper-evident seal that may be adapted for use on a utility service enclosure, transportation or cargo containers or on other enclosures needing a tamper-evident seal and locking apparatus. Moreover, a utility service enclosure or other containers, for example, may have various configurations, shapes and sizes and be used in the electric utility industry, (e.g., a meter box) as well as in the gas, water, cable, TV utility industries or in the shipping or transportation industries.

The locking pin could also be configured to be used to unite a plurality of structures, used with a utility service enclosure, or for example used to seal or create a tamper-evident seal to indicate tampering with, for example, utility enclosures doors, lids or other secured panels, meter boxes, or trucking, shipping, airline or other transportation or cargo containers or other enclosures. The plurality of structures could include plates having apertures, engageable protrusions, or other engageable structural configurations such that the plates could be united with a locking pin, or in some embodiments a fracturable locking pin, of various configurations adapted to fit security enclosures used various industries.

The design described does not limit the scope of the embodiments of invention; the number of various elements may change, or various components may be added or removed to the above-described concept, for example, to aid in improved security and operation.

The foregoing disclosure and description of embodiments of the invention is illustrative and explanatory of the above and variations thereof, and it will be appreciated by those skilled in the art, that various changes in the design, organization, order of operation, means of operation, equipment structures and location, methodology, the use of mechanical equivalents, such as different types of fasteners and locking devices than as illustrated whereby different steps may be utilized, as well as in the details of the illustrated construction or combinations of features of the various elements may be made without departing from the spirit of the embodiments of the invention. As well, the drawings are intended to describe various concepts of embodiments of the invention so that presently preferred embodiments of the invention will be plainly disclosed to one of skill in the art but are not intended to be manufacturing level drawings or renditions of final products and may include simplified conceptual views as desired for easier and quicker understanding or explanation of embodiments of the invention. As well, the relative size and arrangement of the components may be varied from that shown and the embodiments of the invention still operate well within the spirit of the embodiments of the invention as described hereinbefore and in the appended claims. Thus, various changes and alternatives may be used that are contained within the spirit of the embodiments of the invention.

Accordingly, the foregoing specification is provided for illustrative purposes only, and is not intended to describe all possible aspects of the example embodiments of the invention. It will be appreciated by those skilled in the art, that various changes in the ordering of steps, ranges, interferences, spacings, hardware, and/or attributes and parameters, as well as in the details of the illustrations or combinations of features of the methods and system discussed herein, may be made without departing from the spirit of the embodiments of the invention. Moreover, while various embodiments of the invention have been shown and described in detail, those of ordinary skill in the art will appreciate that changes to the description, and various other modifications, omissions and additions may also be made without departing from either the spirit or scope thereof.

What is claimed is:

1. An apparatus for use with a meter sealing ring, the meter sealing ring comprising first and second ends, the meter sealing ring adapted for use in installing a meter to a watthour meter box, the apparatus comprising:
    a lock having a head member and a shank portion comprising moveable locking members and a plunger member comprising a larger diameter portion and a smaller diameter portion, the shank portion comprising an outer surface proximal the moveable locking members, and wherein the moveable locking members may be fully radially retracted inward within the outer surface of the shank portion and disposed adjacent the smaller diameter portion of the plunger member, the shank portion being inserted through an aperture formed in the first end of the sealing ring; and
    wherein the shank portion is inserted through a retaining sleeve after the shank portion is inserted through the aperture formed in the first end of the sealing ring, and wherein the retaining sleeve is adapted to capture the shank portion even if the moveable locking members are fully radially retracted inward within the outer surface of the shank portion and disposed adjacent the smaller diameter portion of the plunger member, and wherein the sleeve is prevented from separating from the shank portion.

2. The apparatus of claim 1, wherein the first end of the sealing ring is disposed between the retaining sleeve and the head member, and wherein the lock is permanently retained on the first end of the sealing ring.

3. The apparatus of claim 1, wherein the shaft portion comprises a shaft member, and wherein a portion of the shaft member is nonreleaseably retained by the sleeve.

4. The apparatus of claim 1, wherein the retaining sleeve is adapted to slidably capture the shank portion.

5. The apparatus of claim 1, further comprising a receiving member disposed on the second end of the sealing ring, the receiving member adapted to receive the moveable locking members of the shank portion, wherein the first and second ends of the sealing ring may be secured between the receiving member and the head member.

6. The apparatus of claim 5, wherein the shank portion may be removed from the receiving member in an unlocked position, and wherein the shank portion remains captured by the retaining sleeve.

7. The apparatus of claim 5, wherein the first end of the sealing ring is disposed between the retaining sleeve and the head member, and wherein the lock is permanently retained on the first end of the sealing ring.

8. An apparatus for securing first and second ends of a meter sealing ring, the meter sealing ring adapted for use in installing a meter to a watthour meter box, the apparatus comprising:
    a lock having a head member and a shank portion comprising moveable locking members and a plunger member comprising a larger diameter portion and a smaller diameter portion, the shank portion comprising an outer surface proximal the moveable locking members, and wherein the moveable locking members may be fully radially retracted inward within the outer surface of the shank portion and disposed adjacent the smaller diameter portion of the plunger member, the shank portion being insertable through an aperture formed in the first end of a sealing ring;
    wherein the shank portion is inserted through a retaining sleeve after the shank portion is inserted through the aperture formed in the first end of the sealing ring, and wherein the retaining sleeve defines an aperture configured to receive a portion of the shank portion therethrough, the retaining sleeve configured to capture the shank portion even if the moveable locking members are fully radially retracted inward within the outer surface of the shank portion and disposed adjacent the smaller diameter portion of the plunger member, and wherein the retaining sleeve is prevented from separating from the shank portion, the first end of the sealing ring being disposed between the retaining sleeve and the head member, and a receiving member disposed on a second end of the sealing ring, the receiving member configured to secure the moveable locking members of the shaft portion, wherein the first and second ends of the sealing ring may be secured between the receiving member and the head member.

9. The apparatus of claim 8, wherein the first end of the sealing ring is slidably disposed between the retaining sleeve and the head member, and wherein the lock is permanently retained on the first end of the sealing ring.

10. The apparatus of claim 8, wherein the shaft portion comprises a shaft member, and wherein a portion of the shaft member is nonreleaseably retained by the sleeve.

11. The apparatus of claim 8, wherein the retaining sleeve is adapted to slidably capture the shank portion.

12. The apparatus of claim 8, wherein the retaining sleeve is disposed between the first and second ends of the sealing ring.

13. The apparatus of claim 12, wherein the shank portion may be removed from the receiving member in an unlocked position, and wherein the shank portion remains captured by the retaining sleeve.

14. The apparatus of claim 12, wherein the first end of the sealing ring is slidably disposed between the retaining sleeve and the head member, and wherein the lock is permanently retained on the first end of the sealing ring.

15. An apparatus for securing first and second ends of a meter sealing ring, the meter sealing ring adapted for use in installing a meter to a watthour meter box, the apparatus comprising:

a lock having a head member and a shank portion comprising moveable locking members, the shank portion being insertable through an aperture formed in the first end of a sealing ring;

wherein the shank portion is inserted through a retaining sleeve after the shank portion is inserted through the aperture formed in the first end of the sealing ring, and wherein the retaining sleeve defines an aperture configured to receive a portion of the shank portion therethrough, the retaining sleeve configured to capture the shank portion, wherein the first end of the sealing ring is disposed between the retaining sleeve and the head member; and a receiving member disposed on a second end of the sealing ring, the receiving member configured to secure the moveable locking members of the shaft portion, wherein the first and second ends of the sealing ring may be secured between the receiving member and the head member.

16. The apparatus of claim 15, wherein the first end of the sealing ring is slidably disposed between the retaining sleeve and the head member, and wherein the lock is permanently retained on the first end of the sealing ring.

17. The apparatus of claim 15, wherein the shaft portion comprises a shaft member, and wherein a portion of the shaft member is nonreleaseably retained by the sleeve.

18. The apparatus of claim 15, wherein the retaining sleeve is adapted to slidably capture the shank portion.

19. The apparatus of claim 15, wherein the retaining sleeve is disposed between the first and second ends of the sealing ring.

20. The apparatus of claim 19, wherein the shank portion may be removed from the receiving member in an unlocked position, and wherein the shank portion remains captured by the retaining sleeve, the first end of the sealing ring being slidably disposed between the retaining sleeve and the head member, and wherein the lock is permanently retained on the first end of the sealing ring.

* * * * *